US009596477B2

United States Patent
Chou et al.

(10) Patent No.: US 9,596,477 B2
(45) Date of Patent: Mar. 14, 2017

(54) METHODS OF MULTIPLE-SLICE CODING FOR FRAME BUFFER COMPRESSION

(71) Applicant: MEDIATEK INC., Hsin-Chu (TW)

(72) Inventors: Han-Liang Chou, Hsinchu County (TW); Kun-Bin Lee, Taipei (TW)

(73) Assignee: MEDIATEK INC., Hsinchu (TW)

( * ) Notice: Subject to any disclaimer, the term of this patent is extended or adjusted under 35 U.S.C. 154(b) by 291 days.

(21) Appl. No.: 14/444,910

(22) Filed: Jul. 28, 2014

(65) Prior Publication Data
US 2015/0187045 A1    Jul. 2, 2015

Related U.S. Application Data

(60) Provisional application No. 61/920,841, filed on Dec. 26, 2013.

(51) Int. Cl.
*H04N 19/189*  (2014.01)
*H04N 19/436*  (2014.01)

(52) U.S. Cl.
CPC ......... *H04N 19/189* (2014.11); *H04N 19/436* (2014.11)

(58) Field of Classification Search
CPC .... H04N 19/70; H04N 18/174; H04N 19/172; G06F 15/7867
See application file for complete search history.

(56) References Cited

U.S. PATENT DOCUMENTS

| | | | | |
|---|---|---|---|---|
| 2003/0138043 A1* | 7/2003 | Hannuksela | ........... | H04N 19/46 375/240.08 |
| 2011/0026604 A1* | 2/2011 | Zhao | ..................... | H04N 19/70 375/240.25 |
| 2014/0105493 A1* | 4/2014 | Wu | .......................... | G06T 9/00 382/166 |

* cited by examiner

*Primary Examiner* — Maurice L McDowell, Jr.
(74) *Attorney, Agent, or Firm* — McClure, Qualey & Rodack, LLP

(57) ABSTRACT

Method is disclosed for reducing frame buffer, stream buffer, reconstruction buffer, or latency associated with frame buffer compression in an encoder or decoder with multiple slices of an image frame. The image frame is divided into multiple slices vertically, horizontally or both. One core compressor or decompressor can be used to process two or more slices. The encoding and decoding of two or more slices may be performed in parallel. Instead of encoding an entire slice, the encoder compresses only partial data of one slice before encoding another slice. According to one embodiment, each slice is divided into two or more partitions. The encoder is switched to another slice after encoding one partition of one slice. In another embodiment, the encoder is switched to another slice based the information related to the coding status. The decoding order may be same as the encoding order.

23 Claims, 14 Drawing Sheets

METHODS OF MULTIPLE-SLICE CODING FOR FRAME BUFFER COMPRESSION

CROSS REFERENCE TO RELATED APPLICATIONS

The present invention claims priority to U.S. Provisional Patent Application, No. 61/920,841, filed on Dec. 26, 2013. This U.S. Provisional Patent Applications is hereby incorporated by reference in its entirety.

FIELD OF THE INVENTION

The present invention relates to image data processing. In particular, the present invention relates to methods of encoding and decoding an image frame with multiple slices for frame buffer compression.

BACKGROUND

With the development of image processing technique, the image display is improved from lower definition to higher definition. The amount of data to be transmitted increases significantly with the improvement of the definition, such as from 1280×720 to 1920×1088 or 2560×1600. When the display controller (DC) reads the pixels out from frame buffer at fixed rate, the requirement for the transmission bandwidth as well as the power consumption increases significantly to display high definition images. On the other hand, the requirement for the frame buffer size increases with the growing of image size. Thus, frame buffer compression (FBC) is a trend for image coding and transmission. By frame buffer compression, the transmission bandwidth between the transmit buffer (TX) and the receive buffer (RX) can be reduced. Moreover, the frame buffer size inside a RX device can also be reduced by frame buffer compression.

The algorithm used for frame buffer compression is related to the partition method of an image frame. In order to enhance the throughput for large size image, the image frame is usually split into multiple slices for encoding. The image frame can be divided into vertical slices, horizontal slices or interleaved slices.

FIG. 1A illustrates an example of dividing an image frame into vertical slices. Frame 110 is split into two vertical tiles corresponding to slice 0 and slice 1. This type of partition is referred as vertical partition in this disclosure. FIG. 1B illustrates an example of horizontal partition. Frame 120 is split into two horizontal tiles corresponding to slice 0 and slice 1. This type of partition is referred as horizontal partition in this disclosure. When an image frame is split into interleaved slices, each slice comprises multiple units which are interleaved vertically or horizontally with units of other slice or slices. FIG. 1C illustrates an example of interleaving partitions. Frame 130 is split into interleaved slice 0 and slice 1. The multiple units of slice 0 are interleaved with the multiple units of slice 1. In the method based on interleaving partition, both the encoder and the decoder follow the same interleaving algorithm.

In conventional method, the encoder compresses each slice of the image frame to generate a bitstream, regardless of the partition being vertical or horizontal. The bitstream from each slice may be packed in the sequence from the first slice to the last slice or the bitstreams from the multiple slices may be packed into interleaved segments.

In the case of non-interleaved streams, bitstreams are received in sequence from the first slice to the last slice and no stream of the current slice is received before the stream of previous slice finishes. No matter the image frame is divided into multiple slices by vertical or horizontal partition, the multiple slices in the image frame should be decoded one by one. Thus, the decoding of the next slice starts after finishing the current slice. Therefore, the throughput is limited because the multiple slices cannot be decoded in parallel by a multiple cores decoder without increasing frame buffer size. In non-interleaved streams, larger frame buffer size is required for decoding the multiple slices in parallel to obtain high throughput.

Due to the cost associated with the frame buffer, it is important to avoid the need of large frame buffer size for decoding multiple slices in parallel. Therefore, it is preferred to pack the bitstreams from the multiple slices into interleaved segments. FIG. 2A illustrates an example of the streams generated from compressing an image frame which is split into slice 0 and slice 1. The compressor encodes the image frame to generate a slice 0 stream and a slice 1 stream. The two streams are buffered into fixed size packets to form interleaved segments with each packet stores one segment. In the conventional approach, one or more stream buffers are used to store the complete slice 0 stream and slice 1 stream as shown in FIG. 2A. If the interleaved stream is desirable, the slice 0 stream and slice 1 stream are further segmented into smaller slice 0 packets and slice 1 packets. The slice 0 packets and slice 1 packets are then interleaved to form a desired interleaved stream.

Among the interleaved segments, at least one segment of one slice stream is inserted into another slice stream. FIGS. 2B to 2D show three examples to pack the streams into interleaved segments. Each fixed size packet contains one segment of slice 0 stream or one segment of slice 1 stream. In the example shown in FIG. 2B, each segment of one slice is interleaved with one or two segments of another slice. As shown in FIG. 2B, packet 212 stores one segment of slice 1 which is interleaved with two segments of slice 0 stored in packets 211 and 213. In the example shown in FIG. 2C, the buffer stores one or two segments of one slice and then buffers one or two segments of another slice in the following packet(s). All the packets, such as packet 221 and 222, have a fixed size. The buffer may also store the data streams in another pattern as shown in FIG. 2D. The first fixed size packet stores one segment of slice 0 stream and the last fixed size packet preserves the last segment of slice 0 stream. In the other fixed size packets, each pair packets are used to store two segments for slice 0 or slice 1. As shown in FIG. 2D, packet 231 stores one segment for slice 0. Packets 232 and 233 are used to keep two segments for slice 1. The next two packets are filled with segments for slice 0.

Within each slice, the image data is usually processed line by line or block by block in raster scan fashion. In case of packing slice 0 and slice 1 streams into interleaved segments, the stream data are received with the segments of slice 0 stream interleaved with the segments of slice 1 stream. When the image frame is divided into horizontal slices (i.e., horizontal partition), the multiple horizontal slices can be decoded in parallel by multiple de-compressors. In this case, for each scan line or each row of blocks of the image frame, multiple de-compressors can be used for decoding. However, for decoding each scan line based on vertical partition, only one de-compressor can be used since slice 1 processing cannot be started until slice 0 is finished. Therefore, horizontal partition is preferred for providing higher decoding throughput on each scan line. Moreover, larger reconstruction buffer may be required for vertical partition since slice 1 reconstructed data is not displayed immediately.

In conventional video slice encoding based on horizontal partition, encoder will completely encode one slice and then start to process the next slice. The image frame is encoded slice by slice and in each slice the coding blocks are compressed row by row. FIG. 3 illustrates an example of conventional video slice coding order based on horizontal partition. The image frame is coded based on 16 blocks $a_{i,j}$ in which i represents the row number and j represents the column number. The 16 blocks are divided into two tiles, i.e., slice 0 and slice 1. The encoding of slice 0 starts from block $a_{0,0}$ and following the order shown by the arrows in slice 0. After finishing slice 0, the encoder processes slice 1 from block $a_{0,2}$ to coding block $a_{3,3}$ following the order illustrated by the arrows in slice 1. The slice coding order is different from the nature order of display interface.

However, the tile base coding order of horizontal slices is different from the nature order of display interface. In the decoder side, the reconstructed image frame is displayed row by row in the whole frame. FIG. 4 illustrates an example of display order. The reconstructed blocks are displayed in the order shown by the arrows. Due to the requirement of interleaved segments for delivering to the de-compressor side, slice 0 stream will be totally buffered until all the pixels in slice 0 are compressed by the encoder. Thus, the stream buffer has to be large enough to store the entire stream of slice 0.

Therefore, it is desirable to develop frame buffer compression so that the stream buffer size and/or the latency can be reduced without noticeable impact.

BRIEF SUMMARY OF THE INVENTION

Methods and apparatus are disclosed for encoding and decoding multiple slices of an image frame for frame buffer compression. According to the present invention, the encoding may be performed in an interleaving order on the multiple slices. The number of the encoder modules may be different from the number of the multiple slices in the image frame. One encoder module can be used to encode two or more slices in the image frame.

According to the first embodiment of the present invention, the image frame in an image or video system is received and divided into multiple slices for compressing. The multiple slices comprise slice one and slice two. Each slice of the video frame is split into multiple partitions for encoding. Each partition for each slice is encoded to generate a bitstream. Among the multiple slices of the video frame, the encoding for the slice one starts before the encoding for the slice two. Moreover, at least one partition of the slice two is encoded before the last partition in the slice one. One or more stream buffers are used to store the bitstreams associated with the multiple partitions from the multiple slices. The bitstreams associated with the multiple partitions from each slice are packed into segments. Each segment has a fixed size. The segments for the multiple slices are interleaved for providing. At least one segment for the slice two may be provided after a first segment for the slice one and before the last segment of the slice one.

In the first embodiment, the image frame may be partitioned into the multiple slices vertically, horizontally or both vertically and horizontally. Each slice may correspond to a first rectangular pixel group. Each partition may contain one or more compression blocks. The compression blocks in each partition may be equal to, less than or more than one row of compression blocks. Each compression block can be a second rectangular pixel group which comprises one or more pixels.

According to the second embodiment of compressing the image frame in the image or video system, the image frame is also received and divided into multiple slices which comprises slice one and slice two. In this embodiment, the encoding is switched from one slice to another slice based on information related to the coding status associated with the multiple slices. The information may comprise one or a combination of a pre-defined bitstream size, the amount of data stored in said one or more stream buffers, the fullness status of said one or more stream buffers, the current encoding position in the image frame, and the amount of data in the processing unit.

The encoder encodes a processing unit in a current slice to generate a bitstream associated with the processing unit in current slice. The processing unit is smaller than the current slice. The bitstream associated with the processing unit for the current slice is stored in one or more stream buffers. The bitstreams for each slice are packed into segments and each segment has a fixed size. The segments for the multiple slices are interleaved for delivering. In the interleaved segment, at least one segment for the slice two is provided after a first segment for the slice one and before a last segment of the slice one.

The image frame may be partitioned into the multiple slices vertically, horizontally or both vertically and horizontally. Each slice may correspond to a first rectangular pixel group which may contain two or more compression blocks. The compression blocks in each processing unit may be equal to, less than or more than one row of compression blocks. Each compression block can be a second rectangular pixel group which comprises one or more pixels.

In the present invention, the method is also disclosed for de-compressing on an image frame in an image or video system. The image frame is divided into multiple slices which comprise slice one and slice two. Each slice may correspond to a first rectangular pixel group. The first rectangular pixel group may correspond to two or more decoded units. Each decoded unit may contain a second rectangular pixel group which comprises one or more pixels. The decoding of the multiple slices may also be performed in an interleaving order. The number of the decoder modules can be not equal to the number of the multiple slices in the image frame. One decoder module can be used to decode two or more slices in the image frame.

According to one embodiment of the present invention, each slice is partitioned into multiple partitions for decoding. A bitstream associated with the image frame is received for de-compressing. The bitstream comprises interleaved multiple segments for the multiple slices and each segment has a fixed size. The interleaved multiple segments are de-interleaved by dispatching each of the interleaved multiple segments into one or more corresponding stream buffers for each slice. For each slice, the bitstream in one or more corresponding stream buffers is decoded to generate decoded partitions. Each decoded partition may be equal to, less than or more than one row of de-compressed blocks. The decoding for the slice one starts before the decoding for the slice two and at least one decoded partition of the slice two is generated before the last decoded partition in the slice one. The decoded partitions are provided for displaying the image frame.

According to another embodiment of the present invention, a bitstream associated with the image frame is received for de-compressing. The bitstream comprises interleaved multiple segments for the multiple slices and each segment has a fixed size. The interleaved multiple segments are de-interleaved by dispatching each of the interleaved multiple segments into one or more corresponding stream buffers for each slice. The decoder decodes the bitstream in one or more corresponding stream buffers for a current slice to generate a decoded unit in the current slice. The decoded unit is smaller than the current slice. Each decoded unit may be equal to, less than or more than one row of de-compressed blocks. The decoded units for the image frame are provided for displaying. At least one decoded unit of slice two may be provided after the first decoded unit and before the last the decoded unit of the slice one.

The decoding is switched to another slice based on information related to the decoding status associated with the multiple slices. The information may comprise one or a combination of a pre-defined size of decoded bitstream associated with the current slice, the amount of data stored in the corresponding stream buffers, the fullness status in the corresponding stream buffer, the current decoding position in the image frame, and the amount of data in the decoded unit.

BRIEF DESCRIPTION OF THE DRAWINGS

FIG. 1A illustrates an exemplary vertical partition of an image frame.

FIG. 1B illustrates an exemplary horizontal partition of an image frame.

DETAILED DESCRIPTION OF THE INVENTION

Figure 1C:
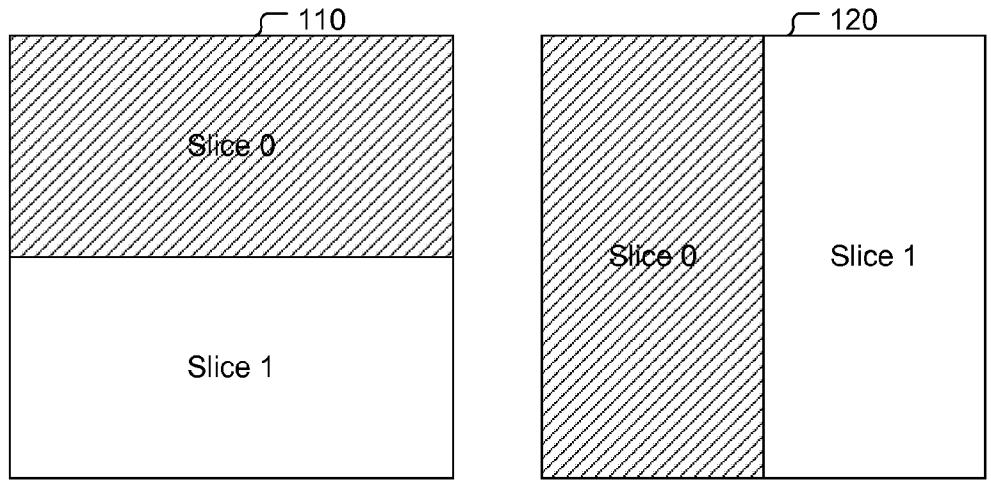
FIG. 1C illustrates an exemplary of interleaving partition of an image frame.
Figure 1C:
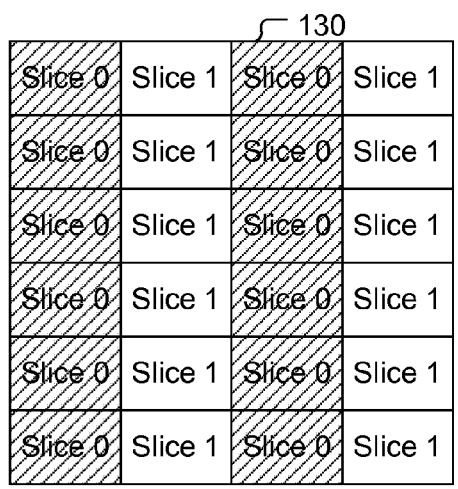

In the present invention, methods of encoding or decoding an image frame are developed for frame buffer compression in an image or video system. The image frame to be processed can be divided into multiple slices vertically, horizontally or both vertically and horizontally. The multiple slices comprise at least two slices. For description, these two slices are named as slice 0 and slice 1 in the present invention and the encoding of slice 0 starts before the encoding of slice 1. Slice 0 and slice 1 are any two slices in the image frame. The decoding of slice 0 may starts before or after the decoding of slice 1. Each of the multiple slices is a rectangular pixel group which comprises two or more pixels. According to the present invention, the frame buffer, reconstruction buffer, stream buffer, and/or the latency can be reduced compared with traditional coding methods based on horizontal partition or interleaved partition.

In order to reduce the stream buffer size in encoder or reduce the reconstruction buffer in decoder, the encoder compresses only one part of slice 0 before switching to slice 1 according to the present invention. The decoder can also de-compress only partial data of one slice before switching to another slice. Thus, the corresponding stream buffer or frame buffers of slice 0 is designed for storing only partial data of slice 0. When the decoding of slice 0 starts before the decoding of slice 1, the reconstruction buffer may store partial reconstructed data of slice 1 for decoding these two slices in parallel. Therefore, the frame buffer compression method according to the present invention can reduce the stream buffer size on encoder and reconstruction buffer on decoder.

In order to reduce the compressor cost, one module may be used for encoding two or more slices. Similarly, one module may be used to decode two or more slices in the image frame. Therefore, the number of the encoder or decoder modules may be less than the number of the multiple slices in the image frame. When the clock rate of an application processor is high enough with advanced process (e.g. 28 nm), single core compressor may be used to encode two or more slices of the image frame. Thus, the compressor cost may be saved by using single core compressor. In the decoder side, it is also possible to use single-core decoder to decode two or more slices. In another embodiment, however, the number of the encoder or decoder modules may be larger than the number of the multiple slices in the image frame.

According to the present invention, the coding processes for two or more slices can be processed in parallel by multi-core compressor so that the encoding or decoding throughput can be improved. For example, slice 0 and slice 1 are compressed by a multi-core compressor. After encoding the first part of slice 0, the processing steps performed on slice 0 can be performed in parallel with the processes performed on slice 1. The processing steps may correspond to compressing of each part, buffering and packaging the encoded bitstream into segments, and delivering the segments. In the decoding side, the decoding of the two slices can also be performed in parallel. After decoding the first part for the image frame, the following processing steps performed on slice 0 and slice 1 can be performed in parallel.

Figure 2A:
FIG. 2A illustrates an example of bitstreams generated by compressing two slices of an image frame.
Figure 2A:
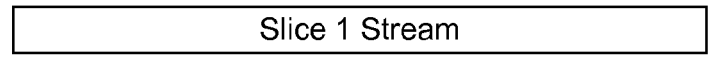
Figure 2B:
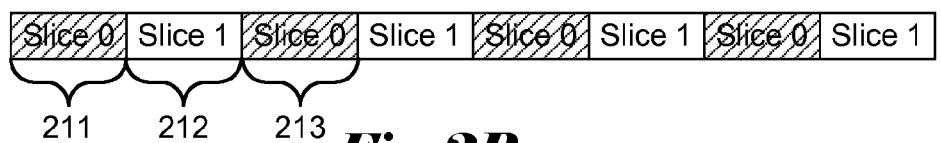
FIG. 2B illustrates an example of interleaving segments of the encoded bitstreams for the image frame.
Figure 2C:
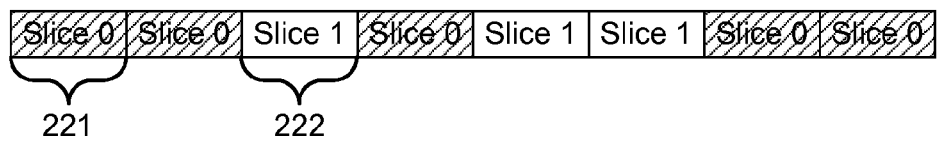
FIG. 2C illustrates an example of interleaving segments of the encoded bitstreams for the image frame.
Figure 2D:
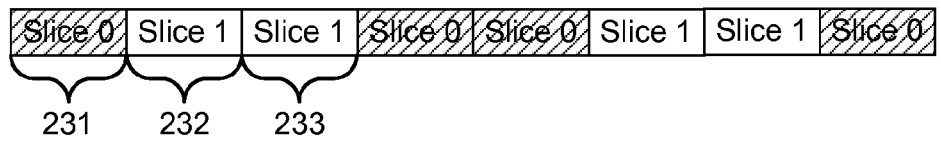
FIG. 2D illustrates another example of interleaving segments of the encoded bitstreams for the image frame.
Figure 3:
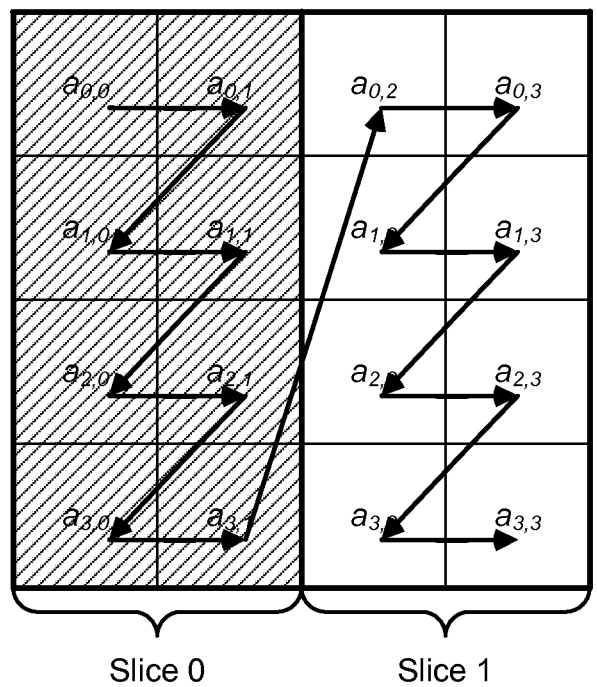
FIG. 3 illustrates an example of conventional video slice encoding order for an image frame divided into horizontal slices.
Figure 4:
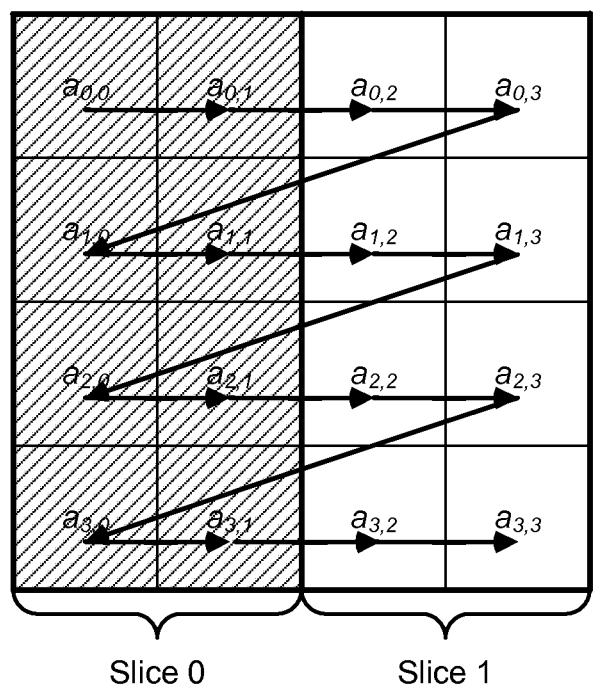
FIG. 4 illustrates an example of display order in a display interface.

In the present invention, the encoded bitstreams for the multiple slices are interleaved and packed into fixed-size packets to generate interleaved segments. Among the interleaved segments, at least one segment of one slice is inserted into another slice stream. One segment of any slice in the image frame can be the first segment of the interleaved segments. For an image frame divided into slice 0 and slice 1, the segments of slice 0 and slice 1 can be arranged in any interleaved order, such as the order shown in FIG. 2B, 2C or 2D.

The bitstream for each processing unit is stored in one or more packets for the corresponding slice. When the bitstream of the current processing unit exceeds one or more packets, the exceeded part is packed into the following packet for the current slice. The bitstream of the following processing unit in the current slice is packed behind the exceeded part of the current processing unit.

According to the first embodiment of the present invention, each slice is divided into multiple partitions. The encoding of the image frame is based on the partitions. Each partition may be less than, equal to or more than one row of compression blocks in each slice. Two or more slices can be compressed by one encoder module. The de-compression of multiple slices can also be performed by one decoder module.

Figure 5A:
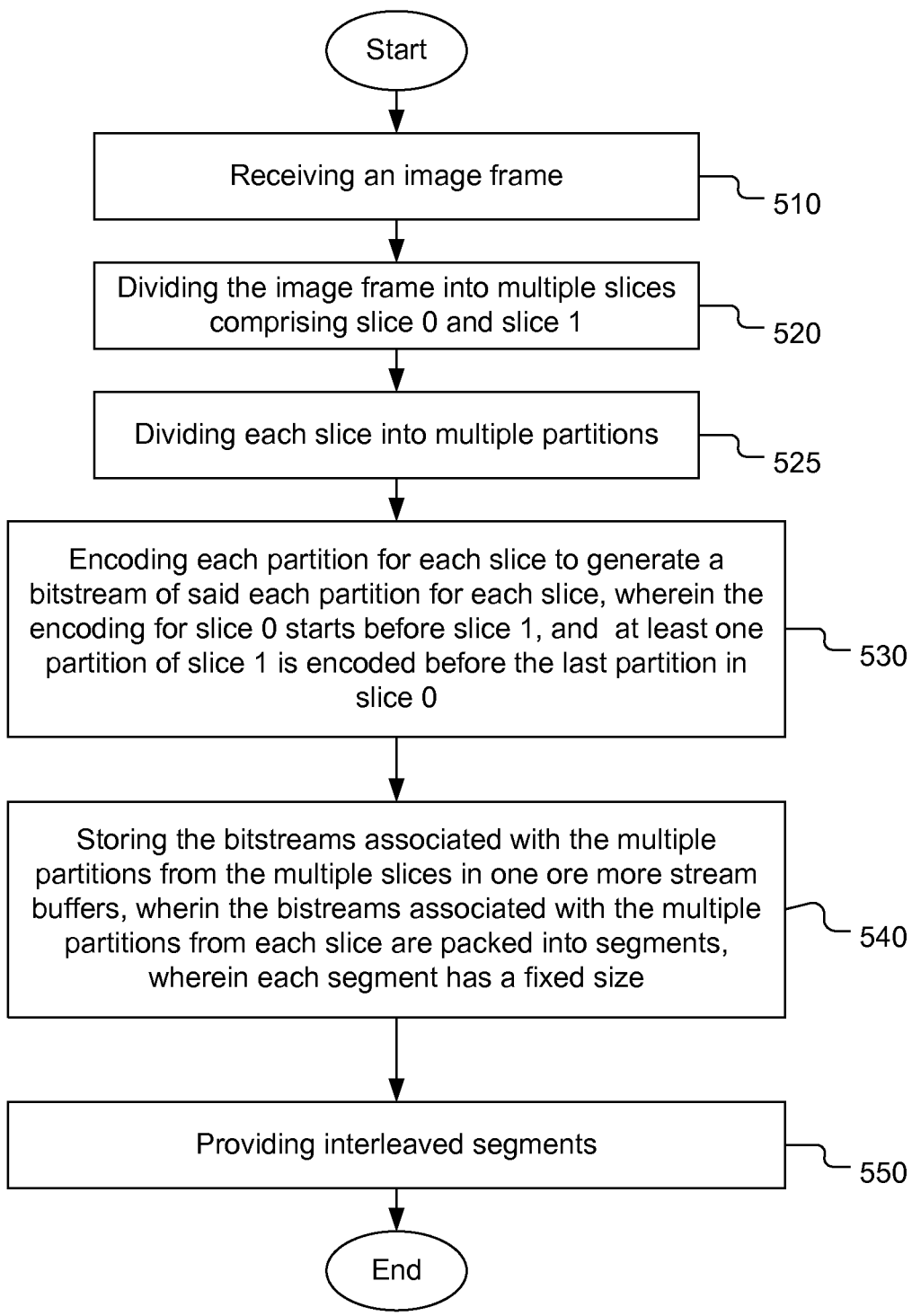
FIG. 5A illustrates an exemplary flow chart of compressing the multiple slices for an image frame according one embodiment of the present invention.

FIG. 5A illustrates an exemplary flowchart for encoder incorporating an embodiment of the present invention. After receiving an image frame in step 510, the image frame is divided into multiple slices in step 520. The multiple slices comprise slice 0 and slice 1. In this embodiment, each slice is further divided into multiple partitions for compressing in step 525. Each partition comprises one or more compression blocks. Each compression block is a rectangular pixel group consisting of one or more pixels.

In step 530, the encoder encoding each partition for each slice to generate a bitstream. The encoding for the slice 0 starts before the encoding for the slice 1 and at least one partition of the slice 1 is encoded before the last partition in the slice 0. Temporal storage is used to preserve the internal encoding information for the multiple slices. The bitstreams for the multiple partitions from multiple slices are buffered and packed into fixed size segments in step 540. One or more frame buffer may be used to store the bitstreams. In order to reduce the stream buffer size, less than all the bitstreams of one slice may be stored in the corresponding stream buffer or buffers. For example, one bitstream of the slice 0 and one bitstream of the slice 1 are stored in one stream buffer. The bitstreams are packed into interleaved segments for providing in step 550.

Figure 5B:
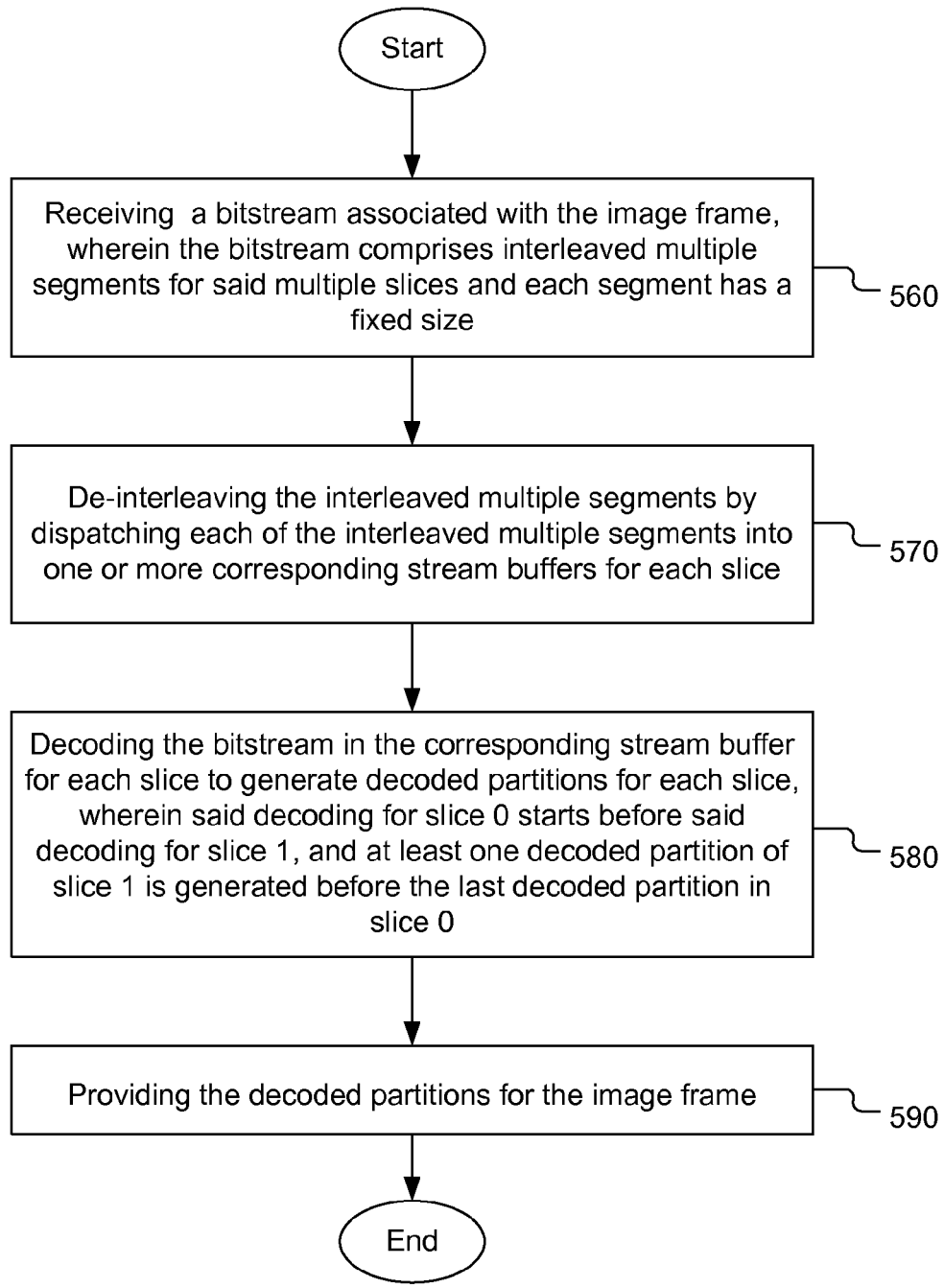
FIG. 5B illustrates an exemplary flow chart of de-compressing the multiple slices for the image frame according one embodiment of the present invention.

FIG. 5B illustrates an exemplary decoding flow chart for the multiple slices encoding with the method shown in FIG. 5A. Interleaved segments delivered from the encoding side are received in step 560. In step 570, the multiple segments are de-interleaved and each segment is dispatched into one or more corresponding stream buffers for the corresponding slice. The decoder decodes the bitstream in the corresponding stream buffer to generate decoded partitions for each slice in step 580. The decoding for slice 0 starts before the decoding for slice 1 and at least one partition of slice 1 is generated before the last partition of slice 0. The decoder may use a single-core decompressor to decode two or more slices of the image frame. The number of decoder modules can be less the number of the multiple slices of the image frame. The decoded partitions for the image frame are provided or displayed in step 590.

Figure 6A:
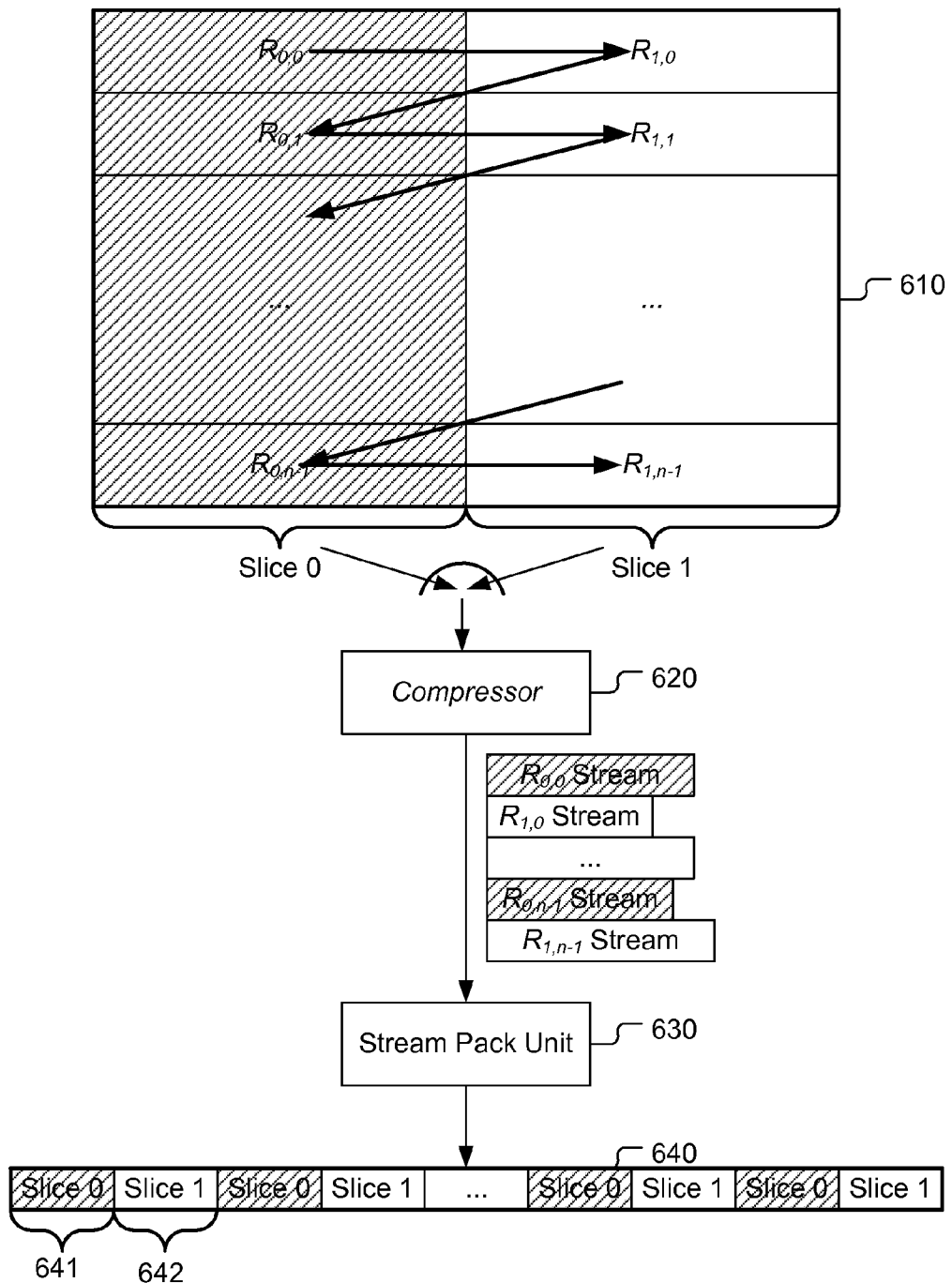
FIG. 6A illustrates an example of compressing the multiple slices for an image frame according one embodiment of the present invention.

FIG. 6A illustrates an example of the first embodiment. In this example, the compressor processes the multiple slices of the image frame following the raster scan order on display. Thus, the encoding order is same as the displaying order. Each slice of the image frame is divided into coding block (or compression block) rows. Image frame 610 is horizontally divided into slice 0 and slice 1. Each slice is further divided into multiple rows with each partition corresponding to one row of compression blocks. Each compression block may be a one-dimension or two-dimension rectangular pixel group which comprises one or more pixels. The rows in slice 0 is represented by $R_{0,0}$ to $R_{0,n-1}$ and the rows in slice 1 is represented by $R_{1,0}$ to $R_{1,n-1}$ in which n is a number larger than 2. The encoder compresses one row of one slice and then compresses one row of another slice by compressor 620. As shown by the arrows in FIG. 6A, the compressor 620 encodes the image frame row by row. The internal encoding information of slice 0 and slice 1 is kept using temporal storage.

The compression on each row of slice 0 and slice 1 generates bitstreams which are named as $R_{0,0}$ stream to $R_{1,n-1}$ stream. The bitstreams of slice 0 and slice 1 are delivered to stream pack unit 630 to form interleaved segments 640. One bitstream of slice 0 and one bitstream of slice 1 in the same row of the image frame may delivered and packed together. For example, $R_{0,0}$ stream to $R_{1,0}$ stream are delivered together to stream pack unit 630. Then, stream pack unit 630 provides the interleaved segments of $R_{0,0}$ stream to $R_{1,0}$ stream to the decoder. Each of the fixed-size packets is used to contain one segment of slice 0 or one segment of slice 1. The segments of slice 0 are interleaved with the segments of slice 1. As shown in FIG. 6A, packet 641 stores one segment of slice 0 and packet 642 contains one segment of slice 1. In the example shown in FIG. 6A, the stream buffer for slice 0 stores stream of one or more rows instead of the entire slice. The delivering of the interleaved segments may be performed before finishing slice 0. Therefore, the requirement for stream buffer size and the transmission bandwidth can be reduced compared with encoding entire slice 0 before encoding slice 1.

Figure 6B:
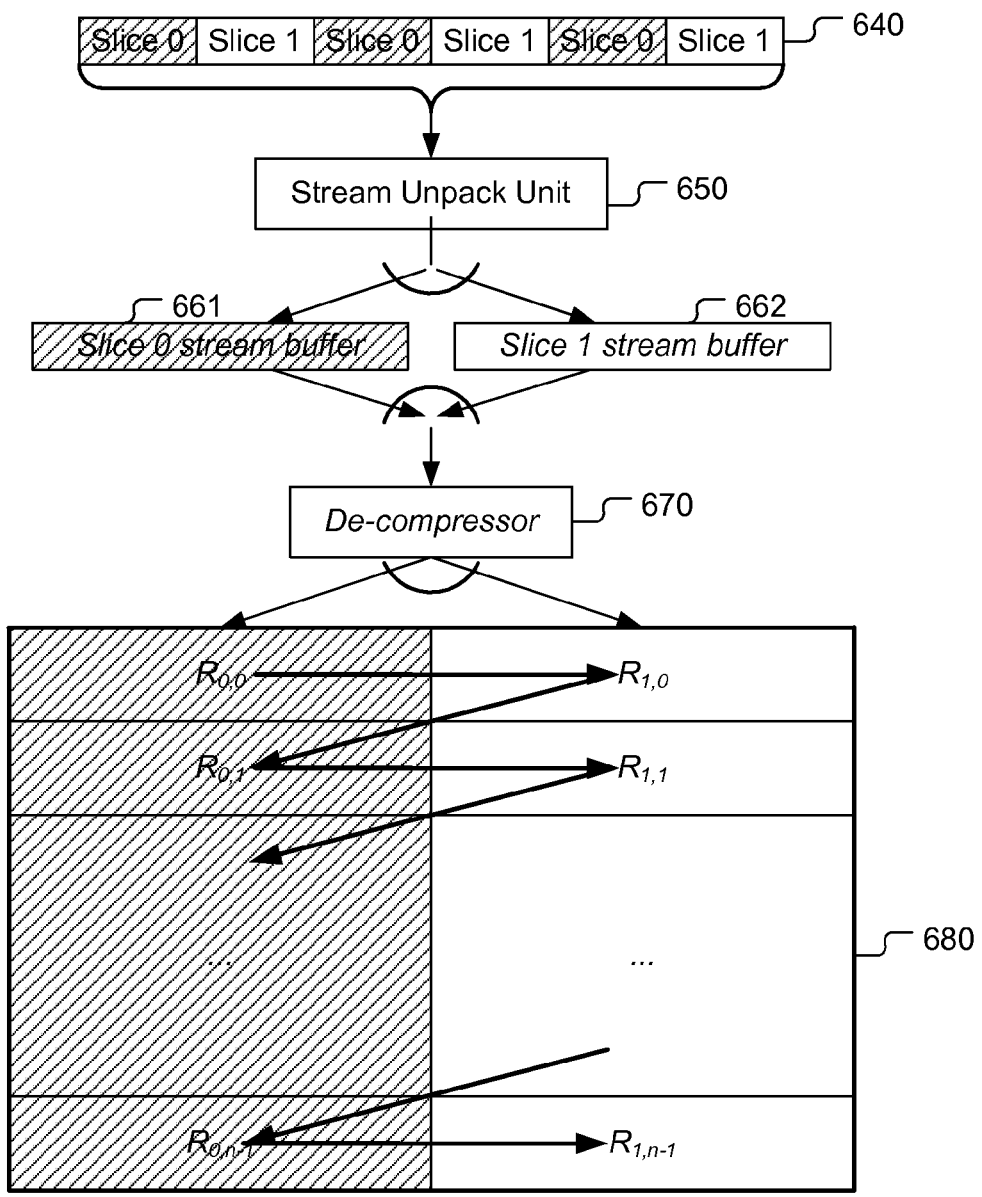
FIG. 6B illustrates an example of de-compressing the multiple slices for an image frame according one embodiment of the present invention.

FIG. 6B shows an example of decoding interleaved segments 640 with one de-compressor. The decoding of slice 1 starts after de-compressing data to form one decoded row in slice 0. Therefore, the decoding throughput can be improved compared with decoding slice 1 after decoding all the data of slice 0. Interleaved segments 640 are received and de-interleaved by stream unpack unit 650. Each segment is dispatched to the corresponding frame buffer for slice 0 or slice 1. As shown in FIG. 6B, the segments of slice 0 are stored in slice 0 stream buffer 661 and the segments of slice 1 is stored in slice 1 stream buffer 662. Since only one de-compressor 670 is used to decoding both slices, the de-compressor 670 is switched between these two stream buffers to fetch bitstreams for the corresponding slice.

The de-compressing order shown in FIG. 6B is similar to the compressing order. As shown by the arrows in decoded image frame 680, the de-compressor 670 decodes bitstreams and provides reconstructed data row by row. A temporal storage is used to preserve the internal decoding information of slice 0 and slice 1.

According to another example of the first embodiment, each slice of the image frame is divided into multiple strips. Each strip contains one or more compression blocks which are less than one row. The number of the compression blocks in each strip may be determined based on the frame buffer size or how much transmitting bandwidth could be used. The encoder compresses one or more strips of slice 0 to generate a bitstream for slice 0. Then the encoder is switched to encode slice 1. Thus, the frame buffer may store only partial data of one row in slice 0.

Figure 7:
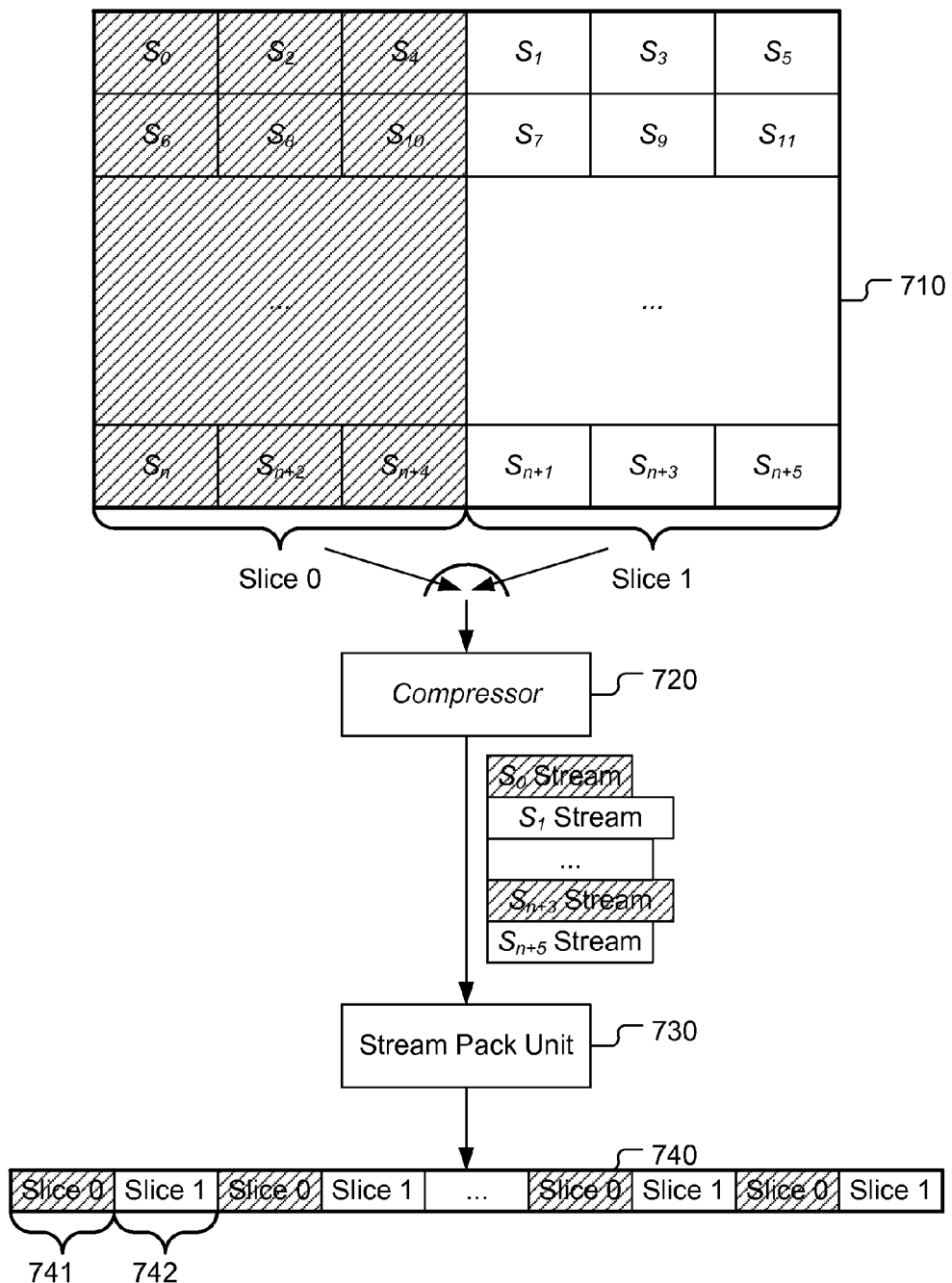
FIG. 7 illustrates another example of compressing the multiple slices for an image frame according one embodiment of the present invention.

FIG. 7 illustrates an example of encoding based on strips. Each of the two slices in image frame 710 is divided into n+6 (n is a number not less than zero) strips. Each strip is denoted as $S_i$ in which the strip number i is from 0 to n+5. Each row of slice 0 or slice 1 is divided into three strips. The number of the compression blocks in each strip may be same. A single compressor 720 is used to compress slice 0 and slice 1. The encoder may compress one strip of one slice and then be switched to another slice by the compressor 720. For example, the encoding of each strip follows the strip number from 0 to n+5 shown in FIG. 7. The encoder may compress two strips of one slice before being switched to another slice by the compressor 720. For example, the compressor 720 compresses strips 0 and 2 in slice 0 and then compresses strips 1 and 3 in slice 1.

Compressor 720 encodes strip $S_i$ to generate $S_i$ stream. The internal encoding information of slice 0 and slice 1 is kept in a temporal storage. The streams of the strips are packed into fixed size packets by stream pack unit 730. Each fixed size packet contains one fixed size segment of slice 0 or slice 1. As shown in FIG. 7, packet 741 contains one segment of slice 0 and packet 742 contains one segment of slice 1. The segments from slice 0 and slice 1 are interleaved by stream pack unit 730 for delivering to the decoder.

The decoder may de-compress interleaved segments 740 in the same order of encoding. When one de-compressor is used for decoding both slice 0 and slice 1, the decoder de-compresses one or more strips for one slice and then is switched to de-compress one or more strips for another slice. The decoding flow can be similar to the decoding flow shown in FIG. 6B except the decoding is based on strips. Consequently, the size of each stream buffer is designed to preserve enough data for reconstructing one or more strips in the corresponding slice.

According to the second embodiment of the present invention, the coding system encodes one part of one slice and switches to encode another slice based on the information related to the coding status associated with the multiple slices. The image frame is also divided into multiple slices which comprise slice 0 and slice 1. When one encoder module is used to encoding slice 0 and slice 1, the encoding of the slice 0 starts before the encoding of the slice 1. The information may be the pre-defined bitstream size, the amount of data stored in the corresponding stream buffer for the current slice, the fullness status of the corresponding stream buffer, the current encoding position in the image frame, the amount of data in the processing unit, or a combination of the foregoing.

If the amount of data in the processing unit may be used to determine the switch operation, the compressor may compress a pre-defined amount of data and switch to another slice. For example, the encoder is switch to another slice when compresses 2.5 rows in the current slice. The switching operation may be determined according to the current position in the image frame.

When the current encoding position in the image frame is used as the determination information, the encoding operation is switched at one pre-defined position in the current slice. For example, the pre-defined position for slice 0 is the end of the third row and the pre-defined position for slice 1 is the middle of the second compression block row. The compressor is switched to process slice 1 when it is detected the current position is the end of the third compression block row in slice 0. After compressing the data to the middle of the second row in slice 1, the compressor is switched back to slice 0.

In the second embodiment, the stream buffers are local storage in the coding system. The size of each stream buffer is variable and designed for storing one or more processing units of the corresponding slice. No stream buffer is used for buffering the full image frame or one entire slice according to the present invention. The fullness status of each stream buffer can be used to determine the switching operation of encoding or decoding. For example, the compressor is switched to another slice when the stream buffer is full or the buffered stream is over a threshold for the current slice.

In the second embodiment, it is not required to split each slice into multiple partitions. The encoder compresses one processing unit of the current slice and then is switched to compress another slice. Each processing unit may consist of one or more coding blocks (or compression blocks). The encoding of slice 1 starts after the encoding of the first processing unit and before the last processing unit of the slice 0. Each processing unit in slice 0 is smaller than the whole slice. During encoding, the encoder may compress less than or more than one row in one slice before being switched to compress another slice.

Similarly, the decoding is switched to another slice based on the information related to the decoding status associated with the multiple slices. The information for determining the switching operation of decoding may be one or a combination of the pre-defined size of the decoded bitstream associated with the current slice; the amount of data stored in the corresponding stream buffers; the fullness status in the corresponding stream buffer; the current decoding position in the image frame; and the amount of data in the decoded unit.

Figure 8A:
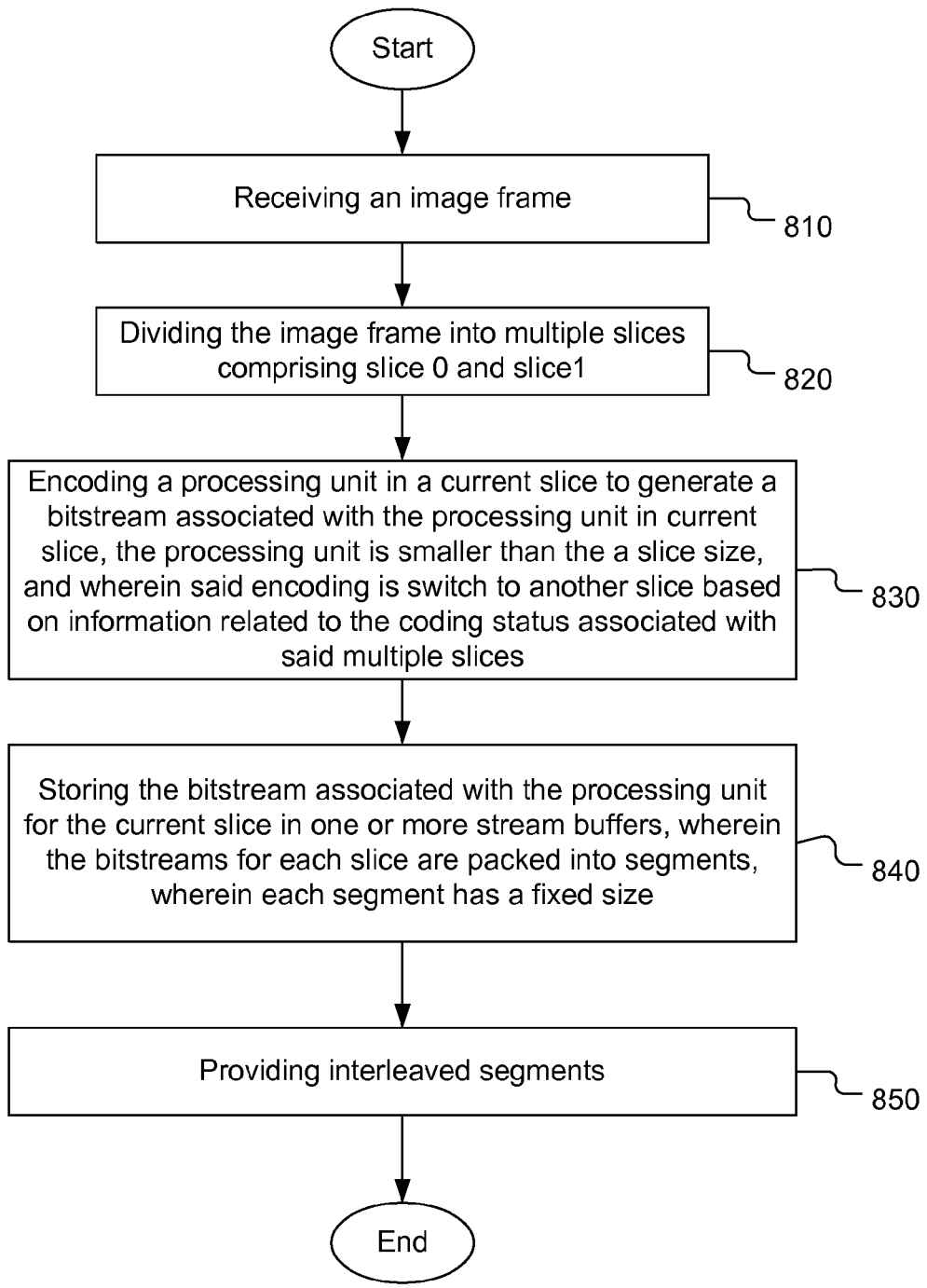
FIG. 8A illustrates an exemplary flow chart of compressing the multiple slices for an image frame according another embodiment of the present invention.

FIG. 8A illustrates an exemplary encoding flow chart according to the second embodiment of the present invention. After receiving an image frame in step 810, the image frame is divided into multiple slices in step 820. The multiple slices comprise slice 0 and slice 1.

The encoder encodes a processing unit in a current slice to generate a bitstream associated with the processing unit in step 830. The encoder may use one module to encode two or more slices of the image frame. Therefore, the number of the encoder module may be less than the number of the slices in the image frame. Each processing unit may comprise one or more compression blocks and may be less than, equal to or more than one row of compression blocks. Each compression block is a rectangular pixel group consisting of one or more pixels. The encoder is switched to another slice according to the information related to the coding status associated with the multiple slices. It would be appreciated that the number of the encoder module may be larger than the number of the multiple slices in the image frame.

The bitstreams associated with the multiple processing units are buffered in one or more corresponding stream buffers. The bitstreams for each slice are packed into fixed size packets in step 840. In order to reduce the frame buffer size, less than all the compressed data of slice 0 may be stored in the corresponding stream buffer or buffers. The bitstreams for the multiple slices are interleaving packed to form interleaved segments. Among the interleaved segments, at least one segment of one slice is inserted into another slice stream. The interleaved segments are provided for decoding in step 850.

Figure 8B:
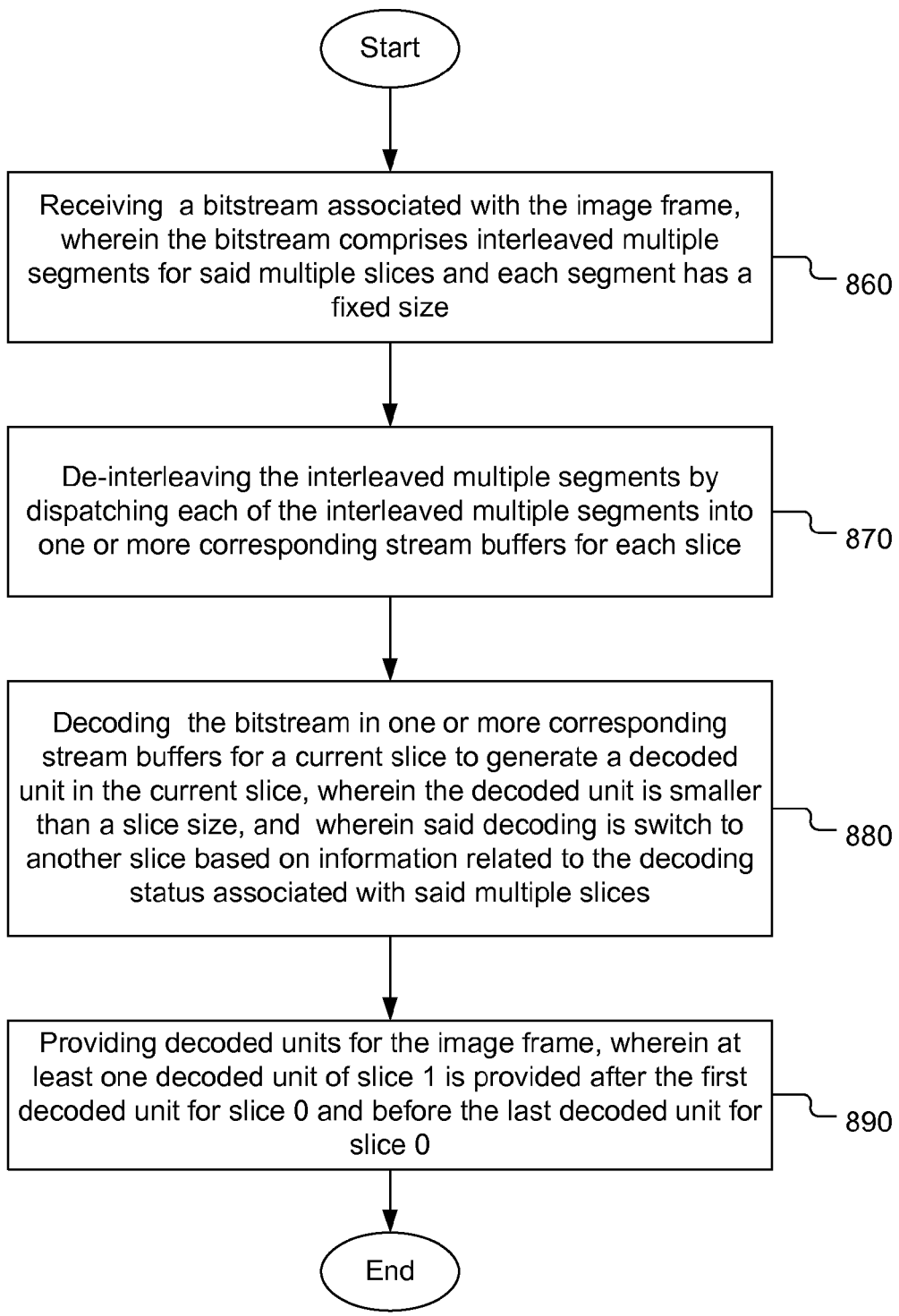
FIG. 8B illustrates an exemplary flow chart of de-compressing the multiple slices for the image frame according another embodiment of the present invention.

FIG. 8B illustrates an exemplary decoding method to de-compress the multiple slices encoded by the method shown in FIG. 8A. The interleaved segments for the multiple slices are received in step 860. In step 870, the multiple segments are de-interleaved and each segment is dispatched into one or more corresponding stream buffers for the corresponding slice. The decoder decodes the bitstream in one or more corresponding stream buffer in step 880. Two or more slices of the image frame may also be decoded using a single de-compressor based on the decoding status. For decoding slice 0 and slice 1 with the single decompressor, the decoder decompresses only partial data of slice 0 before decompressing slice 1. More specifically, the number of the decoder modules may be not equal to the number of the multiple slices in the image frame.

By decoding the segments stored in one or more corresponding stream buffers for a current slice, a decoded unit in the current slice is generated. The decoded unit is smaller than a slice size. The decoded units for the image frame are provided or displayed in step 890. At least one decoded unit of the slice 1 is provided after the first decoded unit for the slice 0 and before the last decoded unit for the slice 0.

Figure 9A:
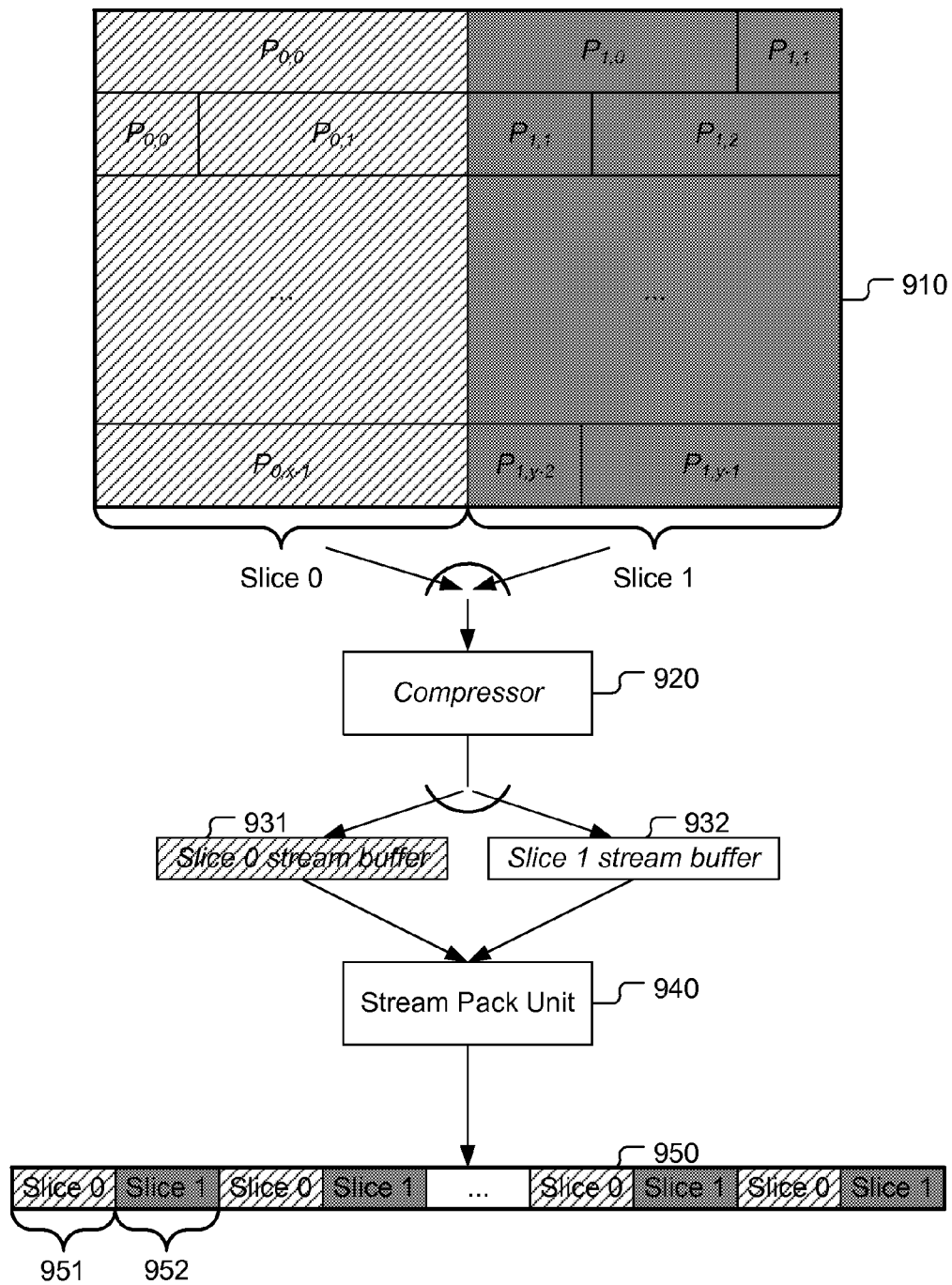
FIG. 9A illustrates an example of compressing two slices with one compressor according one embodiment of the present invention.

FIG. 9A illustrates an exemplary flowchart of encoding two slices of the image frame using one compressor according to the second embodiment. Image frame 910 is divided into slice 0 and slice 1 horizontally. The encoding of image frame 910 starts from slice 0 by using single compressor 920. The compressor is dynamically switched between slice 0 and slice 1 until the entire image frame is encoded. The switching operation is determined based on the information related to the coding status associated with the multiple slices. Each processing unit $P_{0,x-1}$ in slice 0 or each processing unit $P_{1,y-1}$ in slice 1 may be less than, equal to or larger than one row compression blocks of the corresponding slice. Natural number x is larger than 2 and may be equal or not equal to natural number y.

The bitstream of each processing unit in slice 0 is stored in stream buffer 931 for slice 0 and the bitstream of each processing unit in slice 1 is preserved in stream buffer 932 for slice 1. The size of each stream buffer is variable. The bitstreams for these two slices are packed into fixed size packets to form interleaved segments 950 by using stream pack unit 940. As shown in FIG. 9A, packet 951 stores one segment of slice 0 and packet 952 contains one segment of slice 1.

Figure 9B:
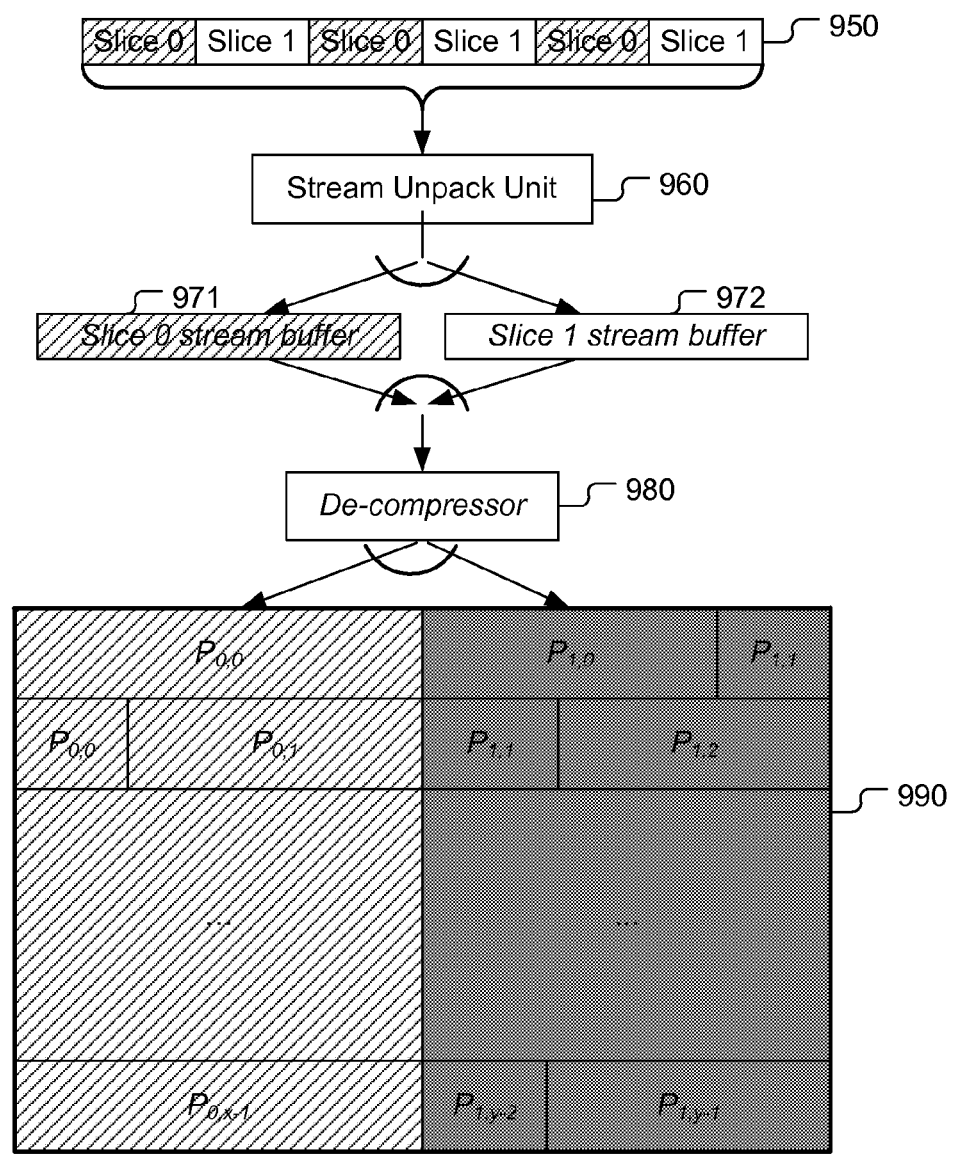
FIG. 9B illustrates an example of de-compressing two slices by using one de-compressor according one embodiment of the present invention.

FIG. 9B shows an example of decoding interleaved segments 950 with one decompressor. Interleaved segments 950 are received and de-interleaved by stream unpack unit 960. Segments of slice 0 are dispatched to slice 0 stream buffer 971 and the segments of slice 1 are dispatched in slice 1 stream buffer 972. In the decoding system, the stream buffer size has to be big enough to store data for reconstruct one processing unit. Therefore, the size of each stream buffer should be equal to or larger than the biggest bitstream size for reconstruct one processing unit. Decompressor 980 is switched between these two stream buffers according to the decoding status associated with these two slices. A temporal storage is used to preserve the internal decoding information of slice 0 and slice 1. The decompressor fetches bitstreams from slice 0 stream buffer 971 for decoding slice 0 and receives bitstreams from slice 1 stream buffer for decoding slice 1. The decompressing order is similar to the compressing order. Decompressor 980 decodes data to reconstruct one processing unit in one slice and then is switched to decode one processing unit in another slice for the reconstruction of image frame 990.

According to one example of the second embodiment, the encoder can be switched to another slice based on the pre-defined bitstream size. The pre-defined threshold for each slice can be the size of one or more packets. Same or different pre-defined thresholds may be used for the multiple slices. The encoder may be switched to another slice when the bitstream generated from the current processing unit in the current slice is equal to or larger than the pre-defined threshold for the current slice. For example, the pre-defined threshold is one or more 64-bit for each slice. The compressor is switched to encode another slice when the accumulated stream for the current processing unit of the current slice is equal to or larger than one or more 64-bit. When the bitstream size of the current processing unit is larger than one or more packets size, the exceeded stream is packed into the following packets for the current slice. The bitstream for the next processing unit of the current slice is packed behind the bitstream of the current processing unit.

Figure 10:
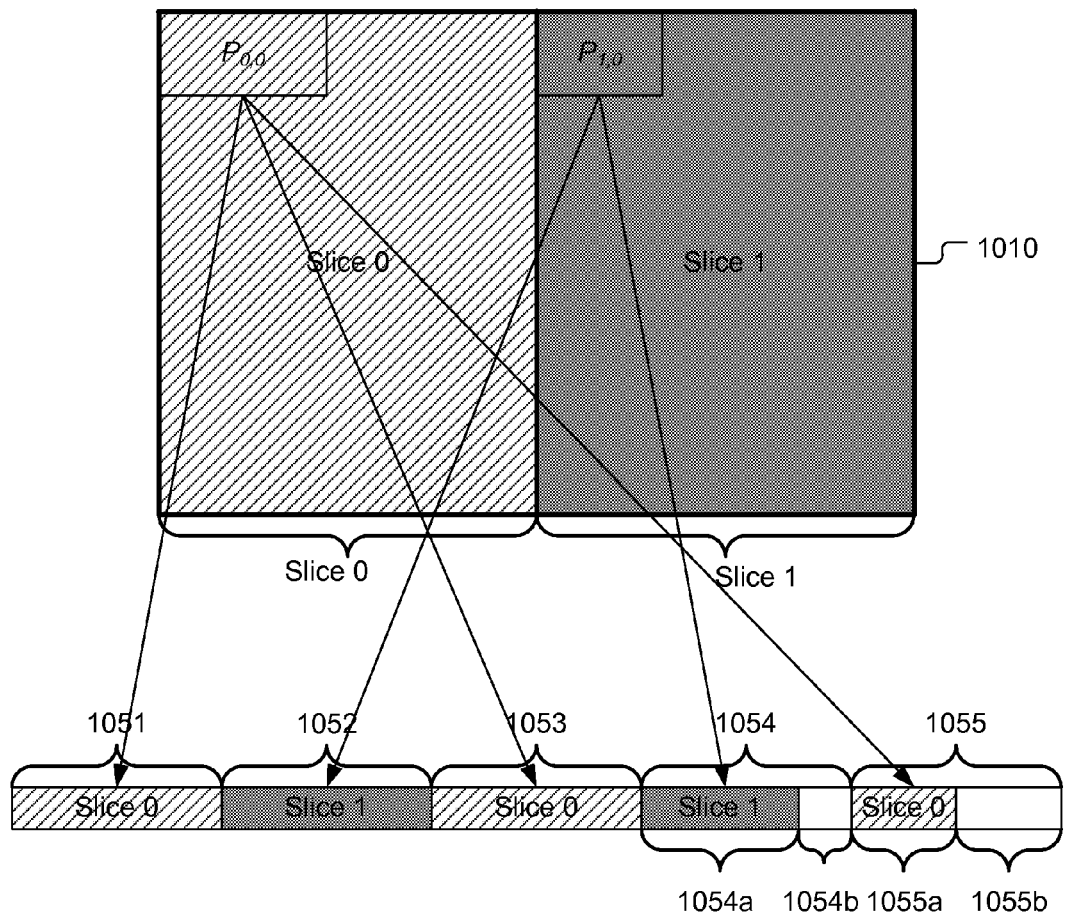
FIG. 10 illustrates an example of compressing the multiple slices of an image frame according to one embodiment of the present invention.

FIG. 10 illustrates an example of switching the compressor based on a pre-defined bitstream size. The pre-defined threshold for slice 0 is two-packet size and the pre-defined threshold for slice 1 is one-packet size. When the size of the bitstream for processing unit $P_{0,0}$ is equal to or larger than the pre-defined size for slice 0, the compressor is switched to encode processing unit $P_{1,0}$ in slice 1.

In this example, the bitstream of processing unit $P_{0,0}$ is larger than two packets size and less than three packets size. Thus the bitstream of processing unit $P_{0,0}$ is stored in packets 1051, 1053 and 1055. In packet 1055, part 1055a contains the exceeded bitstream of processing unit $P_{0,0}$. Thus, the bitstream of the following processing unit in slice 0 is packed from the rest part of packet 1055 which is part 1055b. The bitstream of processing unit $P_{1,0}$ is larger than one packet size. Similarly, the bitstream of processing unit $P_{1,0}$ is stored into packet 1052 and the exceeded part is stored into part 1054a of packet 1054. As shown in FIG. 10, part 1054b is used to store the bitstream of the next processing unit in slice 1.

According to second embodiment, the switching operation of encoding may be determined based on the pre-defined bitstream size only or together with other information. When the switching operation is determined only based on the pre-defined bitstream size, the compressor is switched back to slice 1 after the bitstream of processing unit $P_{1,0}$ reaching the pre-defined threshold. The switching operation may also be determined based on the amount of the bitstream buffered for slice 0 as well as the pre-defined bitstream size for slice 0. In this situation, the compressor may continue encoding slice 1 even after the bitstream of processing unit $P_{1,0}$ filling up one packet. The compressor may be switched to slice 0 until packet 1054 is filled up.

Figure 11:
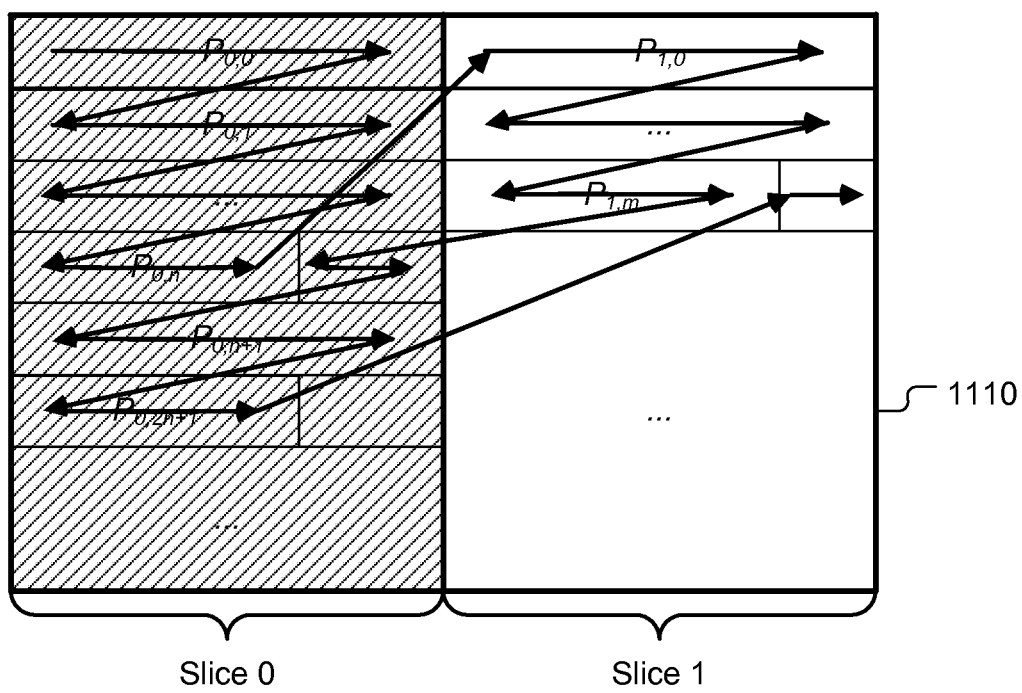
FIG. 11 illustrates another example of compressing the multiple slices of an image frame according to one embodiment of the present invention.

FIG. 11 illustrates another example of switching the encoder dynamically based on two or more information related to the coding status. A single compressor is used to encode slice 0 and slice 1. As shown by the arrows in FIG. 11, the compressor encodes n rows in slice 0 before being switched to slice 1. After compressing m rows in slice 1, the encoder is switched back to slice 0. Number n or m is an integer or non-integer larger than one.

The methods disclosed in the present invention can be used by frame data encoder/decoder on display interfaces, such as Mobile Industry Processor Interface MIPI-DSI (Display Serial Interface) or MIPI-CSI (Camera Serial Interface), or eDP (embedded Display Port), etc. The above description is presented to enable a person of ordinary skill in the art to practice the present invention as provided in the context of a particular application and its requirement.

Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of compressing an image frame in an image or video system, the method comprising:
   receiving the image frame;
   dividing the image frame into multiple slices, wherein the multiple slices comprise slice one and slice two;
   dividing each slice into multiple partitions;
   encoding, by a processing circuit, each partition for each slice to generate a bitstream of said each partition for each slice, wherein said encoding for the slice one starts before said encoding for the slice two, and at least one partition of the slice two is encoded before encoding a last partition in the slice one;
   storing the bitstreams associated with the multiple partitions from the multiple slices in one or more stream buffers, wherein the bitstreams associated with the multiple partitions from each slice are packed into segments, wherein each segment has a fixed size; and
   providing interleaved segments.

2. The method of claim 1, wherein at least one segment for the slice two is provided after a first segment for the slice one and before a last segment of the slice one.

3. The method of claim 1, wherein the image frame is partitioned into said multiple slices vertically, horizontally or both vertically and horizontally.

4. The method of claim 1, wherein each slice corresponds to a first rectangular pixel group.

5. The method of claim 1, wherein each partition corresponds to one or more compression blocks, wherein each compression block corresponds to a second rectangular pixel group, and wherein each second rectangular pixel group comprises one or more pixels.

6. The method of claim 5, wherein each partition is equal to or less than one row of compression blocks.

7. The method of claim 1, wherein said encoding is performed on said multiple slices in an interleaving order.

8. The method of claim 1, wherein said encoding is performed by a first number of encoder modules, and wherein the first number is not equal to a second number of said multiple slices in the image frame.

9. A method of compressing an image frame in an image or video system, the method comprising:
   receiving the image frame;
   dividing the image frame into multiple slices, wherein said multiple slices comprise slice one and slice two;
   encoding, by a processing circuit, a processing unit in a current slice to generate a bitstream associated with the processing unit in current slice, wherein the processing unit is smaller than a slice size, and wherein said encoding is switched to another slice based on information related to coding status associated with said multiple slices;
   storing the bitstream associated with the processing unit for the current slice in one or more stream buffers, wherein the bitstreams for each slice are packed into segments, wherein each segment has a fixed size; and
   providing interleaved segments.

10. The method of claim 9, wherein at least one segment for the slice two is provided after a first segment for the slice one and before a last segment of the slice one.

11. The method of claim 9, wherein the information comprises one or a combination of a pre-defined bitstream size, a first amount of data stored in said one or more stream buffers, a fullness status of said one or more stream buffers, a current encoding position in the image frame, and a second amount of data in the processing unit.

12. The method of claim 9, wherein the image frame is partitioned into said multiple slices vertically, horizontally or both vertically and horizontally.

13. The method of claim 9, wherein each slice corresponds to a first rectangular pixel group.

14. The method of claim 13, wherein the first rectangular pixel group corresponds to two or more compression blocks, wherein each compression block corresponds to a second rectangular pixel group, and wherein each second rectangular pixel group comprises one or more pixels.

15. The method of claim 9, wherein said encoding is performed by a first number of encoder modules, and wherein the first number is not equal to a second number of said multiple slices in the image frame.

16. A method of de-compressing an image frame in an image or video system, wherein the image frame is divided into multiple slices, said multiple slices comprise slice one and slice two, and each slice is partitioned into multiple partitions for decoding, the method comprising:
   receiving a bitstream associated with the image frame, wherein the bitstream comprises interleaved multiple segments for said multiple slices and each segment has a fixed size;
   de-interleaving the interleaved multiple segments by dispatching each of the interleaved multiple segments into one or more corresponding stream buffers for each slice;
   decoding, by a processing circuit, the bitstream in one or more corresponding stream buffers for each slice to generate decoded partitions for each slice, wherein said decoding for the slice one starts before said decoding for the slice two, and at least one decoded partition of the slice two is generated before a last decoded partition in the slice one; and
   providing the decoded partitions for the image frame.

17. The method of claim 16, wherein each decoded partition is equal to or less than one row of de-compressed blocks.

18. The method of claim 16, wherein said decoding is performed by a first number of decoder modules, and wherein the first number is not equal to a second number of said multiple slices in the image frame.

19. A method of de-compressing an image frame in an image or video system, wherein the image frame is divided into multiple slices, said multiple slices comprise slice one and slice two, the method comprising:

receiving a bitstream associated with the image frame, wherein the bitstream comprises interleaved multiple segments for said multiple slices and each segment has a fixed size;

de-interleaving the interleaved multiple segments by dispatching each of the interleaved multiple segments into one or more corresponding stream buffers for each slice;

decoding, by a processing circuit, the bitstream in one or more corresponding stream buffers for a current slice to generate a decoded unit in the current slice, wherein the decoded unit is smaller than a slice size, and wherein said decoding is switched to another slice based on information related to decoding status associated with said multiple slices; and providing decoded units for the image frame, wherein at least one decoded unit of the slice two is provided after a first decoded unit for the slice one and before a last decoded unit for the slice one.

20. The method of claim 19, wherein the information comprises one or a combination of a pre-defined size of decoded bitstream associated with the current slice, a first amount of data stored in the corresponding stream buffers, a fullness status in the corresponding stream buffer, a current decoding position in the image frame, and a second amount of data in the decoded unit.

21. The method of claim 19, wherein each slice corresponds to a first rectangular pixel group.

22. The method of claim 21, wherein the first rectangular pixel group corresponds two or more decoded units, wherein each decoded unit corresponds to a second rectangular pixel group, and wherein each second rectangular pixel group comprises one or more pixels.

23. The method of claim 19, wherein said decoding is performed by a first number of decoder modules, and wherein the first number is not equal to a second number of said multiple slices in the image frame.

* * * * *